United States Patent Office 3,387,027
Patented June 4, 1968

3,387,027
PROCESS FOR MANUFACTURING TEREPHTHALIC ACID
Jacob Alagy, La Celle-Saint-Cloud, France, assignor to Institut Francais du Petrole des Carburants et Lubrifiants, Rueil-Malmaison, Hauts-de-Seine, France
No Drawing. Continuation of application Ser. No. 336,638, Sept. 9, 1964. This application Feb. 8, 1967, Ser. No. 614,750
Claims priority, application France, Jan. 16, 1963, 921,778
3 Claims. (Cl. 260—524)

ABSTRACT OF THE DISCLOSURE

Terephthalic acid has previously been produced by reacting with molecular oxygen an organic solvent solution of a terephthalic acid precursor, such as a p-dialkyl benzene or p-alkylbenzoic acid, in the presencve of an oxidation catalyst such as a heavy metal compound. Applicant has discovered that both the purity and the yield of terephthalic acid thus produced can be materially increased by comminuting the particles of solid terephthalic acid, substantially as they are formed, to a size such that at least 90% by weight of the particles are of a size smaller than 50 microns.

---

This application is a continuation of applicant's copending application Ser. No. 336,638, filed Sept. 9, 1964.

This invention relates to a novel process for the production of terephthalic acid.

A well known process for the manufacture of terephthalic acid consists of reacting molecular oxygen, for instance, as present in air, with a para-dialkyl benzene or an intermediate oxidation product thereof, i.e. para-alkylbenzoic acid, dissolved in an organic solvent such as a fatty acid, particularly acetic acid or its higher homologs, in the presence of a metallic catalyst such as a mineral or an organic salt of a heavy metal, for instance, a heavy metal bromide or a mixture of a heavy metal salt with a bromine-ion liberating compound. The heavy metal bromide may be, for instance, cobalt bromide and/or manganese bromide, whereas the heavy metal salt, for instance, cobalt and/or manganese acetate may be associated with hydrobromic acid or a salt thereof, for instance, sodium or ammonium bromide.

The reaction temperature is usually of the order of from 80 to 275° C and the pressure between 1 and 100 kg./cm.$^2$ absolute. Generally, the reaction is completed after a time in the range of 30 minutes to 25 hours.

The catalyst proportion in the reaction mixture, calculated on the basis of $MnBr_2$, is usually of the order of 0.01 to 10% by weight of the aromatic compound used as starting material.

As starting material there is used, for instance, p-xylene, p-diethylbenzene, p-dipropylbenzene, p-ethyltoluene, p-toluic acid, p-propylbenzoic acid or their homologs, either alone or in admixture with each other.

Processes of this type are disclosed in the U.S. Patents 2,245,528 to Loder; 2,276,774 to Henke; and 2,833,816 to Saffer.

Conventional initiators or other oxidizable substances may also be added to the reactants, for instance, aldehydes or ketones, particularly acetaldehyde or methylethyl ketone.

In view of the low solubility of terephthalic acid in most of the organic solvents, particularly in acetic acid, propionic acid or butyric acid, even at the reaction temperature, the terephthalic acid precipitates at least partially, during the reaction.

This precipitated acid may be separated from the liquid phase by conventional liquid-solid separating techniques such as filtration or centrifugation in the course of and/or at the end of the reaction. The resulting terephthalic acid, however, generally does not exhibit a sufficient degree of purity for use as a reactant in a polycondensation reaction with glycols. Accordingly, in view of this use which of course accounts for the major consumption of terephthalic acid, it is necessary to subject the acid to a further arduous purification treatment or, optionally, to convert it to an intermediate thereof such as, for instance, the methyl diester.

It is, therefore, an object of this invention to avoid the above-mentioned disadvantages of the prior art processes in a direct process for manufacturing terephthalic acid.

It is another object of this invention to provide for such a direct process whereby terephthalic acid is obtained directly with a degree of purity higher than that achievable by the already known oxidation processes.

These and other objects, as may be apparent from the following specification and claims, are obtained as a result of the improved method of this invention which comprises the essential step of comminuting the grains of solid terephthalic acid suspended in the reaction liquid formed, to particles, the major part of which (preferably at least 90%) by weight have a size below 100 microns, generally lower than 50 microns and preferably in the range of from 20 to 50 microns. There is no critical lower limit for the particle size. However too small particles, for example smaller than one micron, are more difficult to isolate from the reaction mixture by conventional separation means.

According to this invention the particle size reduction is continued during the reaction so as to permanently maintain this size of the particles of terephthalic acid.

The comminution of the grains of terephthalic acid may be carried out by means of any convenient comminuting device. Good results have been achieved for instance by use of a turbine grinder or a pump grinder located within the reaction vessel itself, or in an external recycle circuit.

It must be observed that the use of a conventional grinder or even of a turbine grinder or pump must be capable of maintaining the size of the major portion by weight of the grains of terephthalic acid (preferably more than 90% thereof) lower than 100 microns. Furthermore, it is to be appreciated that this invention is not dependent on any specific catalyst starting material or operating condition. Instead this invention is an improvement of any process wherein molecular oxygen is passed in contact with a precursor of terephthalic acid, said precursor being dissolved in solvent, and wherein the molecular oxygen reacts with the precursor to form solid grains of terephthalic acid which precipitate out of solution.

On the other hand, the disclosed operating conditions of the previously mentioned prior art processes are convenient for conducting the present process. It is generally even more preferable, however, to operate in two successive stages, the first of which is conducted at a temperature of from 80° C. to 130° C., and the second at a temperature of about 120° C–160° C., there being at least a 20° C. increase in temperature going from the first to the second stage. The first stage corresponds to the formation of para-alkylbenzoic acid and the second stage to the conversion of the latter to terephthalic acid. In such a two-stage process, only the second stage is concerned with the step of crushing terephthalic acid grains.

The present process can be carried out in a batch, continuous or semi-continuous manner, for instance, in a plurality of reaction vessels of constant but different concentrations.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

The percentages of grains of a given size are given by weight.

Example 1

This example pertains to the prior art processes, and is given for purposes of comparison to illustrate the improvement achievable by the present process.

Into a reaction vessel of vitrified steel are introduced 318.6 g. of p-xylene, 1,800 g. of acetic acid and 15 g. of cobalt bromide. After heating the mixture to 130° C., oxygen is supplied thereto under a pressure of 3 kg./cm.$^2$ at a feed rate of 20 liters per hour (volume at 0° C. and under a pressure of 760 mm. of mercury), while vigorously stirring by means of a non-grinding turbine with blades revolving at a speed of 2,800 revolutions per minute.

At the end of the reaction it is observed that the terephthalic acid suspended in the liquid phase is in the form of grains, about 90% by weight of which have a size higher than 100 microns.

By centrifugation at about 100° C., cooling down to 25° C. and washing with cold water, terephthalic acid is recovered with a molar yield of 90 percent with respect to the converted xylene, the recovered para-toluic acid being not taken into account, and with a degree of purity of 94%.

The starting xylene has been completely converted. The recovered para-toluic acid may also be converted to terephthalic acid in a further step.

Example 2

Example 1 is repeated but with the use of a grinding turbine of the type known by the trademark "Ultra-Turrax" (manufactured by Willems Reactron), all other conditions being unchanged. The terephthalic acid is then obtained with a molar yield of 93%, the recovered para-toluic acid being not taken into account, and with a purity of about 99%. The particle sizes of 90% by weight of the terephthalic acid grains suspended in the liquid phase were in the range of from 20 to 50 microns. The starting xylene has been completely converted.

The recovered para-toluic acid may also be converted to terephthalic acid in a further step.

Example 3

Into a reaction vessel made of vitrified steel are introduced 320 g. of p-xylene, 1.800 g. of acetic acid, 24 g. of sodium bromide, 30 g. of cobalt acetate and 75 g. of methyl ethyl ketone.

After heating the mixture to a temperature of 120° C., oxygen is supplied thereto under a pressure of 5 kg./cm.$^2$, at a feed rate of 20 liters per hour (volume at 0° C. and under a pressure of 760 mm. of mercury), while vigorously stirring by means of a grinding turbine.

The resultant terephthalic acid is formed as particles, 93% by weight of which have a size lower than 100 microns.

After 320 minutes, the reaction mixture is filtered when hot and washed with hot acetic acid. The starting xylene is entirely converted.

The terephthalic acid is obtained with a molar yield of 93% without taking into account the recovered para-toluic acid (98% when taking into account this recovery) and with a purity of 99%.

Example 4

Example 3 is repeated except that the 30 g. of cobalt acetate are replaced by a mixture of 22.5 g. of cobalt acetate with 7.5 g. of manganese acetate.

Eighty-five percent by weight of the terephthalic acid grains suspended in the mixture have sizes lower than 100 microns. After 5 hours the starting xylene is entirely converted, and terephthalic acid is obtained with a molar yield of 92% without taking into account the recovered para-toluic acid (97.5% when taking into account this recovery) and with a purity of 99%.

Example 5

There are used two successive reactors fed in series having a useful capacity of 2 and 4 liters respectively. The temperature and pressure conditions are respectively—

125°C. and a pressure of 8 kg./cm.$^2$ in the first reactor, and 145°C. and a pressure of 5 kg./cm.$^2$ in the second reactor.

Gaseous oxygen is used as oxidizing agent.

Into the first reactor are introduced in a continuous manner, 174 g. per hour of para-xylene and 1 liter per hour of an acetic acid solution having the respective contents of 12 g. per liter of sodium bromide and 30 g. per liter of cobalt acetate. The overflow of the first reator passes to the second reactor which is provided with a grinding turbine. Eighty percent by weight of the terephthalic acid particles have a size lower than 50 microns. The outflow from the second reactor is filtered when hot so as to separate; solid terephthalic acid therefrom. The latter is then washed with hot acetic acid and thereafter with water. The xylene is entirely converted and the terephthalic acid is obtained with a molar yield of 98% taking into account the recovered p-toluic acid. It exhibits a purity of 99.5%.

Example 6

Example 3 is repeated except that the xylene is replaced by 410 g. of para-toluic acid. Ninety percent by weight of the terephthalic acid grains have sizes lower than 100 microns.

The terephthalic acid is so obtained with a molar yield of 98.5%, taking into account the recovered para-toluic acid, and with a purity of 99%.

Example 7

Example 3 is repeated except that the para-xylene is replaced by 486 g. of diisopropylbenzene.

The grains of terephthalic acid are continuously crushed as they are formed as according to Example 3. The terephthalic acid is thus obtained with a molar yield of 92% the recovered intermediate acid being not taken into account.

The starting diisopropylbenzene has been completely converted.

The grains have substantially the same size as in Example 3.

The preceding examples can be repeated with similar results, using the generic and specific reactants and operating conditions hereinbefore described. It is seen that the comminuting step of this invention increases the purity of terephthalic acid to a very high level.

From the foregoing description, one skilled in the art can easily ascertain the essential characteristics of this invention, and, without departing from the spirit and scope thereof, can make various changes and modifications of the invention to adapt it to various usages and conditions. Consequently, such changes and modifications are properly, equitably and intended to be within the full range of equivalents of the following claims.

What is claimed is:

1. In a process for the production of terephthalic acid wherein molecular oxygen is passed in contact with a precursor of terephthalic acid, at a temperature ranging from 80° to 275° C. said precursor being dissolved in a solvent, and wherein the molecular oxygen reacts with the precursor to form solid grains of terephthalic acid which precipitates out of solution, the improvement which comprises the step of comminuting at least 90% by weight of the precipitated grains of terephthalic acid, substantially as they are formed, to a particle size smaller than 50 microns, whereby the purity of the resultant comminuted terephthalic acid is increased over that which would be obtained without the comminuting step.

2. A process according to claim 1, wherein the terephthalic acid precursor is selected from the group consisting of p-dialkyl benzenes and p-alkylbenzoic acids.

3. A process for manufacturing terephthalic acid comprising contacting, in a first stage, an aromatic compound selected from the group consisting of p-dialkyl benzenes and p-alkylbenzoic acids with molecular oxygen in the liquid phase, at a temperature of from 80° to 130° C., in the presence of an oxidation catalyst consisting of a heavy metal compound, and heating in a second stage the resulting reaction product containing p-alkylbenzoic acid with molecular oxygen to a temperature of about 120° to 160° C. while comminuting the produced solid grains of terephthalic acid, substantially as formed, so as to maintain said grains in the form of particles at least 90% of which, by weight, have sizes lower than 50 microns.

References Cited

UNITED STATES PATENTS

| | | | |
|---|---|---|---|
| 2,021,671 | 11/1935 | Skinner | 23—286 |
| 2,833,816 | 5/1958 | Saffer et al. | 260/524 |

OTHER REFERENCES

Perry et al., "Perry's Chem. Engineers' Handbook," 4th Ed. pp. 8–2 TP 155 p. 4 (1963).

HENRY R. JILES, *Primary Examiner.*

R. K. JACKSON, *Examiner.*

S. B. WILLIAMS, *Assistant Examiner.*